Patented Nov. 14, 1944

2,362,511

UNITED STATES PATENT OFFICE 2,362,511

MODIFIED GLYCOLIDE RESINS

Wilber O. Teeters, Roselle, Del., assignor to E. I. du Pont de Nemours & Company, Wilmington, Del., a corporation of Delaware No Drawing. Application November 21, 1939, Serial No. 305,474

4 Claims. (Cl. 260—78)

This invention relates to the modification of glycolide resins and, more particularly, to the preparation of polyglycolide resins having highly useful physical and chemical properties.

When glycolic acid is dehydrated to a polyglycolide there is obtained a dense, brittle, resinous product which is water-sensitive, insoluble in common organic solvents and incompatible with most resinous materials. While it may be saponified with alkalies, thereby giving a salt that is soluble, nevertheless, the resin per se prepared by simple dehydration of glycolic acid is of such nature that its utility is considerably limited due, principally, to its lack of solubility. Moreover, the polyglycolide resin is translucent, and, accordingly, because of its appearance and chemical properties, is not particularly fitted for many uses in the arts.

An object of the present invention is to provide a method of modifying the physical characteristics of polyglycolide (dehydrated glycolic acid). A further object of the invention is to provide modifying agents which will convert the water-sensitive, relatively insoluble polyglycolide to a modified polyglycolide which is water-insensitive and soluble in organic solvents. Yet another object is to provide a method whereby glycolic acid is dehydrated in the presence of an organic compound having bi-functional groups. A further object is to provide new compositions of matter which may be characterized as modified polycolides.

It has been found that the above and other objects of the invention can be realized by incorporating into the polyglycolide molecule modifying agents which have bi-functional groups. By bi-functional groups is meant the modifying agent contains active groups that will react with the hydroxyl and carboxyl groups of the polyglycolide. Examples of such compounds are lactic acid, tartaric acid and like hydroxy-carboxylic acids. It appears that when compounds having these bi-functional groups are heated together with glycolic acid, and the heating continued until substantially no more water is given off, the carboxyl of the modifying agent reacts with the hydroxyl of the glycolide chain, while the hydroxyl of the modifying agent reacts with the carboxyl of the glycolide chain. Other classes of bi-functional compounds may likewise be used, the primary requisite being that the modifying agent contains at least two reactive groups, one of which will react with the hydroxyl and the other with the carboxyl group of the glycolide chain. Examples of such compounds are: amino acetic acid (glycocol), amino propionic acid, amino butyric acid, amino benzoic acid, and higher amino aliphatic and aromatic acids, the polypeptides may likewise be used, as well as the bifunctional compound obtained by the partial interaction of phthalic anhydride and polyhydric alcohol with rosin as illustrated by Examples 2 and 4 leaving a free hydroxyl and a free carboxyl group.

The modification may be effected by adding the desired amount of the modifying agent to the glycolic acid prior to dehydration. The resulting mixture is heated to a temperature of in the neighborhood of 150° to 300° C. and held at that temperature until substantially all of the water has been driven off, which will require in the neighborhood of from 1 to 5 hours. As would be expected, the duration of heating and the amount of the modifying agent added will be governed in large measure by the particular modifying agent used, but it has been found that, generally speaking, 20% by weight of the modifying agent will convert the opalescent-like polyglycolide to a substantially transparent product, and if the amount is increased up to 40 to 55% of the modifying agent, excellent solubilities result and water-sensitivity disappears.

The modifying agents which may be added to give the above desired properties to polyglycolide include lactic acid, tartaric acid, citric acid, glyceric acid, tartronic, malic, racemic, α-hydroxyisobutyric acid, butyro-lactone and capro-lactone, as well as their analogues and homologues.

Other modified polyglycolides which are of special interest are those in which the modifying ingredients selected produce a desired effect. For example, addition of a long chain fatty acid to a reaction mixture containing glycolic acid and a partially condensed phthalic-glyceride (which can be considered as a bi-functional compound) prior to condensation increases the oil and hydrocarbon solubility and decreases the water-sensitivity of the completely condensed resin. Examples of fatty acids are lauric, oleic, stearic, cottonseed oil acids, linseed oil acids, coconut oil acids, etc. Modification of this type improves the pliability of a film and enhances its durability. In achieving such a modification, it has been found desirable to have the ratio of carboxyl and hydroxyl units in the modifying ingredient or ingredients approximately one to one.

In a like manner, abietic acid (rosin) as a modifying agent, in addition to a phthalic-glyceride in the preparation of a modified polyglycolide, produces a resin particularly resistant to moisture, while addition of a long chain fatty alcohol or a cyclic alcohol, such as the terpene alcohols, cyclohexanol and the like to a reaction mixture containing glycolic acid and a partially condensed tri-basic acid-dihydric alcohol prior to final condensation will decrease the water-sensitivity and increase the oil and hydrocarbon solubility of the completely condensed resin.

The more detailed practice of the invention is illustrated by the following examples, in which parts given are by weight unless otherwise stated. There are, of course, many forms of the invention other than these specific embodiments.

*Example 1.*—A mixture of 300 parts of glycolic acid dissolved in 233 parts of water and 117 parts of lactic acid (85%) was heated rapidly to 200° C. in a closed vessel equipped with a mechanical stirrer, thermometer, and condenser set for downward condensation, a slow stream of nitrogen being passed over the reaction mixture to exclude air and aid in the removal of solvent water as well as water of reaction. After 2.0 hours at 200° C., the stirrer was removed and the viscous resinous material heated an additional 0.5 hour in vacuo (15-20 mm. of mercury). The acid number of the reaction product was 75.

The resin was a tough, transparent solid of low melting point (45-50° C.), soluble in dimethyl formamide and was deposited on a glass surface as a clear film.

*Example 2.*—A mixture of 122 parts of glycolic acid, 74 parts of phthalic anhydride, 48 parts of glycerol (96%) and 122 parts of rosin was heated rapidly to 240-250° C. and held between these temperature limits for 45 minutes, in a closed vessel equipped with a mechanical stirrer, thermometer, nitrogen inlet tube (through which nitrogen was introduced during the reaction) and goose neck attached to a condenser set for downward condensation. At the end of this time, the reaction mixture was homogeneous and was heated an additional 2 hours at 215-225° C., in order to complete the condensation. The reaction product is a clear, amber-colored resin, acid number 47. It was soluble in acetone, ethyl acetate, methoxyethanol, chloroform and dioxane, and forms a hard, tackfree film which was particularly resistant to moisture.

*Example 3.*—The reaction procedure of Example 2 was repeated using 380 parts of glycolic acid, 75 parts of tartaric acid and 31 parts of ethylene glycol, the mixture being heated to between 200° and 210° C. for 3 hours and for an additional hour at 190° to 205° C. under a vacuum of 15-20 mm. of mercury. A clear, amber-colored resin, having an acid number of approximately 80, was obtained which was soluble in dioxane and gives a tough, adhesive, transparent film.

*Example 4.*—The reaction conditions of Example 2 were repeated, using 342 parts of glycolic acid, 74 parts of phthalic anhydride, 96 parts of ethylene glycol monoglycolate and 170 parts of rosin. The product was finally heated for 1 hour at 225° C. under vacuum (15-20 mm. of mercury). The reaction product was a clear, reddish-colored resin, soluble in acetone and dioxane and had an acid number of 55.

*Example 5.*—The reaction conditions of Example 2 were repeated using 137 parts of glycolic acid, 37 parts of phthalic anhydride, 24 parts of glycerol (96%) and 70 parts of linseed oil acids (the reaction mixture became homogeneous after 70 minutes at 200° C.) The clear amber-colored resin obtained had an acid number of 56. It was immediately and completely soluble in Hi-flash naphtha (150-200° C.), acetone, isobutyl propionate, toluene and ethoxyethanol. The resin exhibited good adhesion and was moderately pliable.

While the examples do not illustrate the use of a catalyst for accelerating the reaction between the modifying agent and the glycolic acid, a catalyst may be employed for speeding up this reaction, and for this purpose such catalysts as litharge and p-toluene sulfonic acid may be employed. Furthermore, it is advantageous in many instances to conduct the reaction in the presence of a water-withdrawing agent such, for example, as toluene, the halogenated hydrocarbons such as trichlorethylene and the like, for, by so doing, the water formed as a consequence of the reaction may be more readily withdrawn as formed or after the reaction has proceeded to the desired degree.

The modified polyglycolide resins prepared in accord with the invention are particularly adapted for uses in the arts and they may be applied directly therein as plasticizers, extenders and the like for alkyd resins, phenol-formaldehyde and urea-formaldehyde resins; being employed in place of polyvinyl acetate or in conjunction with it for modification of the phenol-formaldehyde resins. They are excellent adhesives for application either from hot melt or solution, the hot melt being particularly applicable for use with those modified polyglycolide resins which are relatively insoluble. They may be used as adhesives or binders, for plywood, for cementing rubber to artificial or natural fabrics such as rayon, cotton, linen, hemp, and the like, for abrasive wheels, sand and emery papers, for cork compositions, for increasing adherence of latex or rubber to metal, for use in the preparation of catalysts, for the preparation of cores in foundry practice and likewise in uses requiring water-sensitive adhesives. The modified resins may be dissolved in suitable solvents and used alone or in conjunction with other lacquer constituents for coating wood, steel, concrete, or other surfaces. They are useful as primers for automobile finishes, as a component in tin decorating varnishes, metal lacquers, etc., and particularly as anti-chalking agents for such applications. The resins may be ground or otherwise comminuted to give a powder which may be used alone or with other constituents as molding compositions to be shaped into many types of fabricated articles. Alone or modified they are likewise broadly applicable for the surface treatment and sizing of fabrics, papers, leather and are particularly useful in coating compositions for the modification of rayon fibers such as cellulose acetate and as a non-slip agent for textiles in general and, especially, rayon fabrics. They may likewise be used as sticking agents in spray-type insecticides and fungicides, particularly in an emulsified state. They have utility in the following miscellaneous applications: as anti-ice-forming agent in semi-water soluble form (to depress freezing point on surfaces exposed to possible collection of ice or sleet); as fat liquor agents for use in the leather industry; the reaction product of high acid number modified polyglycolide with amines, such as ethanolamine, may be used as chitin substitutes; as a solution the modified polyglycolide in formaldehyde or urea formaldehyde is adaptable for the treatment of paper; as a dehydrating agent generally, the molten resin being used; as a bleach in alkyd resins; and as dust collecting agents in place of tricresyl phosphate when used as concentrated solutions of the modified polyglycolide resins. Emulsions of these modified resins may also be prepared and applied directly to surfaces for coating them or admixed with other materials for sizing, impregnating and similar uses.

From a consideration of the above specification, it will be appreciated that many changes may be made in the details therein given without departing from the scope of the invention or sacrificing any of the advantages that may be derived therefrom.

I claim:

1. A process for the preparation of a lactic acid-modified polyglycolide resin which consists of reacting a mixture containing approximately 300 parts of glycolic acid, 233 parts of water and 117 parts of lactic acid (85%) rapidly at a temperature of 200° C., holding the mixture at that temperature for a period of approximately 2 hours and subsequently continuing the heating for another period of approximately ½ hour under vacuum.

2. A process for the preparation of a lactic acid modified polyglycolide consisting of reacting, at a temperature between 150° C. and 300° C., glycolic acid in the presence of water with lactic acid until substantially all of the water has been removed.

3. A process for the preparation of modified polyglycolide resins consisting of reacting at a temperature between 150° C. and 300° C. glycolic acid in the presence of water with a bifunctional compound other than glycolic acid containing one free hydroxyl and one free carboxyl group until substantially all of the water has been removed from the compound.

4. The product prepared in accord with the process of claim 2.

WILBER O. TEETERS.